(No Model.)

H. S. HALL.
EXTENSION TABLE.

No. 265,800. Patented Oct. 10, 1882.

WITNESSES
O. H. Engel
C. Frye

Hiram S. Hall  INVENTOR
By Leggett + Leggett  ATTORNEYS

N. PETERS, Photo-Lithographer, Washington, D. C.

UNITED STATES PATENT OFFICE.

HIRAM S. HALL, OF JAMESTOWN, NEW YORK.

EXTENSION-TABLE.

SPECIFICATION forming part of Letters Patent No. 265,800, dated October 10, 1882.

Application filed July 26, 1882. (No model.)

*To all whom it may concern:*

Be it known that I, HIRAM S. HALL, of Jamestown, in the county of Chautauqua and State of New York, have invented certain new and useful Improvements in Extension-Table Slides; and I do hereby declare the following to be a full, clear, and exact description of the invention, such as will enable others skilled in the art to which it pertains to make and use the same.

My invention relates to slides for extension-tables; and it consists in the peculiar construction of the clip or lug, as will be hereinafter fully set forth and claimed.

Figure 1:
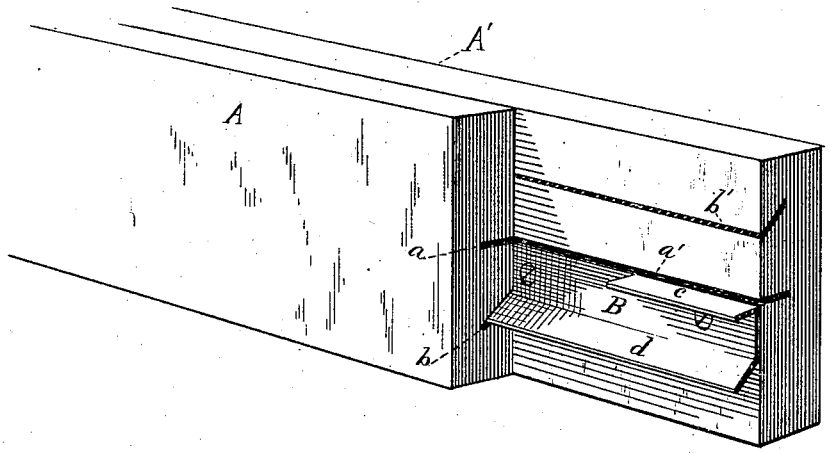
Figure 2:
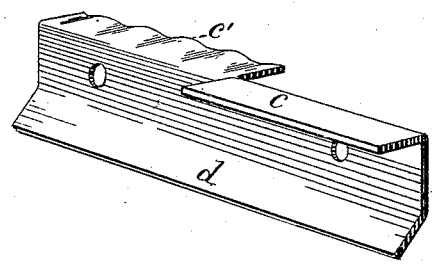

In the drawings, Figure 1 is an isometric view of a table-slide embodying my invention. Fig. 2 is an isometric view of one of my metallic clips or lugs, which is secured to one slide and adapted to engage with the grooves in the adjacent slide.

A A' represent two slides of an extension-table, each of which is provided with one central groove, $a\ a'$, formed at right angles to the faces of the slides A A'. $b\ b'$ are grooves formed so as to diverge from the central grooves, $a\ a'$.

B is my clip, which is formed preferably of plate metal, and bent as shown in Fig. 2, viz: One edge is divided, and one half, $c$, is bent in one direction at a right angle to the clip B, and the other half, $c'$, is bent in the opposite direction, also at a right angle to the body of the clip B. This half $c'$ is corrugated in such a manner as to fill the space of the central groove, $a$, of the slide to which the clip B is secured, and thus act to hold the clip from lateral movement, as the groove $a$ must be made somewhat wider than the thickness of the plate metal of which the clip is formed to allow of the part $c$ of the clip to slide freely therein. The edge $d$ of the clip B is formed at such an angle as to adapt it to engage with one of the diverging grooves, $b$ or $b'$, as shown in Fig. 1.

The manner of securing my clip to the slides and the operation of the whole are as follows: The part $c'$ of the clip B is inserted in the groove $a'$ and the clip secured to the slide A' by means of screws or other suitable securing devices, as shown in Fig. 1. This allows the part $c$ and $d$ to project out from the face of the slide A' in such a manner as to be adapted to engage $c$ with the groove $a$ and $d$ with the groove $b$ of the slide A'. The slide A has also a clip secured to it at the opposite end in such a manner that the edge $d$ of the clip B will project upward at an angle, so as to engage with the groove $b'$, the part $c$ engaging with the groove $a'$.

What I claim is—

A table-slide clip or lug one edge of which is divided and bent in opposite directions at an angle to the body of the lug, one of said bent portions being formed corrugated, substantially as and for the purpose shown and described.

In testimony whereof I have signed my name to this specification in the presence of two subscribing witnesses.

HIRAM S. HALL.

Witnesses:
CLARK R. LOCKWOOD,
JEROME B. FISHER.